(12) United States Patent
Konecky et al.

(10) Patent No.: US 10,957,035 B2
(45) Date of Patent: Mar. 23, 2021

(54) DEFECT CLASSIFICATION BY FITTING OPTICAL SIGNALS TO A POINT-SPREAD FUNCTION

(71) Applicant: KLA-Tencor Corporation, Milpitas, CA (US)

(72) Inventors: Soren Konecky, Alameda, CA (US); Bjorn Brauer, Beaverton, OR (US)

(73) Assignee: KLA Corporation, Milpitas, CA (US)

( * ) Notice: Subject to any disclaimer, the term of this patent is extended or adjusted under 35 U.S.C. 154(b) by 95 days.

(21) Appl. No.: 16/355,584

(22) Filed: Mar. 15, 2019

(65) Prior Publication Data

US 2020/0175664 A1  Jun. 4, 2020

Related U.S. Application Data

(60) Provisional application No. 62/773,834, filed on Nov. 30, 2018.

(51) Int. Cl.
*G06K 9/00* (2006.01)
*G06T 7/00* (2017.01)
(Continued)

(52) U.S. Cl.
CPC ......... *G06T 7/001* (2013.01); *G01N 21/9501* (2013.01); *G06T 7/62* (2017.01);
(Continued)

(58) Field of Classification Search
None
See application file for complete search history.

(56) References Cited

U.S. PATENT DOCUMENTS 5,825,482 A * 10/1998 Nikoonahad .......... G01N 21/94
356/237.2
5,864,394 A * 1/1999 Jordan, III ....... G01N 21/95623
356/237.2

(Continued)

FOREIGN PATENT DOCUMENTS

KR    20110048528 A    5/2011
WO     2017117152 A1    7/2017

OTHER PUBLICATIONS

Nikoonahad et al., "Defect detection algorithm for wafer inspection based on laser scanning." IEEE transactions on semiconductor manufacturing 10, No. 4 (1997): 459-468. (Year: 1997).*

(Continued)

*Primary Examiner* — Feng Niu
(74) *Attorney, Agent, or Firm* — Huse IP Law; Charles C. Huse

(57) ABSTRACT

A semiconductor die is inspected using an optical microscope to generate a test image of the semiconductor die. A difference image between the test image of the semiconductor die and a reference image is derived. For each defect of a plurality of defects for the semiconductor die, a point-spread function is fit to the defect as indicated in the difference image and one or more dimensions of the fitted point-spread function are determined. Potential defects of interest in the plurality of defects are distinguished from nuisance defects, based at least in part on the one or more dimensions of the fitted point-spread function for respective defects of the plurality of defects.

18 Claims, 5 Drawing Sheets

(51) Int. Cl.
*G06T 7/62* (2017.01)
*G01N 21/95* (2006.01)
(52) U.S. Cl.
CPC ........... *G06T 2207/10056* (2013.01); *G06T 2207/30148* (2013.01)

(56) References Cited

U.S. PATENT DOCUMENTS

| | | | | |
|---|---|---|---|---|
| 6,686,994 | B2* | 2/2004 | Wilk | G01N 21/95623<br>250/550 |
| 7,031,796 | B2* | 4/2006 | Lange | G03F 7/70533<br>427/492 |
| 7,242,793 | B2* | 7/2007 | Trobaugh | G06T 7/00<br>382/128 |
| 7,728,969 | B2 | 6/2010 | Saito et al. | |
| 7,912,658 | B2* | 3/2011 | Biellak | H01L 22/12<br>702/40 |
| 8,269,960 | B2* | 9/2012 | Reich | G01N 21/9501<br>356/237.5 |
| 8,340,456 | B1* | 12/2012 | Daneshpanah | H04N 5/23219<br>382/255 |
| 8,494,802 | B2* | 7/2013 | Chen | G01N 21/9501<br>702/108 |
| 9,151,881 | B2* | 10/2015 | Wang | G01N 21/956 |
| 9,310,316 | B2* | 4/2016 | Wu | G01N 21/9501 |
| 9,625,810 | B2* | 4/2017 | Wang | G03F 1/84 |
| 9,727,799 | B2* | 8/2017 | Park | G06K 9/6201 |
| 9,816,940 | B2* | 11/2017 | Chen | G01N 21/8851 |
| 9,875,536 | B2* | 1/2018 | Konecky | G06T 7/001 |
| 10,067,072 | B2* | 9/2018 | Gaind | G01N 21/9501 |
| 10,261,851 | B2* | 4/2019 | Velipasaoglu | H04L 41/16 |
| 10,416,087 | B2* | 9/2019 | Zhang | G01N 21/9501 |
| 10,495,554 | B2* | 12/2019 | Deisseroth | G01N 33/4833 |
| 10,545,020 | B2* | 1/2020 | Amzaleg | G01B 21/02 |
| 2003/0218145 | A1* | 11/2003 | Tanabe | G01N 21/958<br>250/559.45 |
| 2004/0032581 | A1* | 2/2004 | Nikoonahad | G01N 21/55<br>356/237.2 |
| 2011/0229043 | A1* | 9/2011 | Kuraki | G06T 5/003<br>382/218 |
| 2015/0063677 | A1* | 3/2015 | Huang | G06T 5/002<br>382/149 |
| 2015/0324965 | A1* | 11/2015 | Kulkarni | G01B 21/16<br>382/144 |
| 2015/0332445 | A1* | 11/2015 | Harada | G01N 21/9501<br>382/149 |
| 2015/0356719 | A9 | 12/2015 | Geshel et al. | |
| 2016/0180513 | A1 | 6/2016 | Park et al. | |
| 2017/0191945 | A1* | 7/2017 | Zhang | G06T 7/0006 |
| 2017/0205615 | A1* | 7/2017 | Vaziri | G02B 21/367 |
| 2017/0219495 | A1* | 8/2017 | Nagata | G01N 21/88 |
| 2017/0343481 | A1* | 11/2017 | Jahanshahi | G06T 7/0004 |
| 2019/0155164 | A1* | 5/2019 | Chen | G03F 7/7065 |
| 2019/0246005 | A1* | 8/2019 | Fergen | B41F 33/0036 |
| 2020/0004138 | A1* | 1/2020 | Budach | G03F 1/72 |
| 2020/0011659 | A1* | 1/2020 | Sun | G01B 11/2408 |
| 2020/0097751 | A1* | 3/2020 | Xavier da Silveira | G06K 9/209 |
| 2020/0120328 | A1* | 4/2020 | Hamilton | H04N 13/327 |
| 2020/0175352 | A1* | 6/2020 | Cha | G06T 7/0004 |
| 2020/0201018 | A1* | 6/2020 | Vaziri | G02B 21/367 |

OTHER PUBLICATIONS

Wikipedia, "Gaussian function", published on Oct. 26, 2018 (Year: 2018).*
Wikipedia, "Normal distribution", published on Nov. 16, 2018 (Year: 2018).*
Wikipedia, "Residual sum of squares", published on Sep. 5, 2018 (Year: 2018).*
PCT/US2019/063478, International Search Report, dated Mar. 20, 2020.
PCT/US2019/063478, Written Opinion of the International Searching Authority, dated Mar. 20, 2020.

* cited by examiner

200 ⤴

```
┌─────────────────────────────────────────────────────────────────────────────┐
│ Inspect a semiconductor die using an optical microscope to generate a test   │
│ image of the semiconductor die. (102)                                        │
└─────────────────────────────────────────────────────────────────────────────┘
                                      ↓
┌─────────────────────────────────────────────────────────────────────────────┐
│ Derive a difference image between the test image of the semiconductor die    │
│ and a reference image. (104)                                                 │
└─────────────────────────────────────────────────────────────────────────────┘
                                      ↓
┌─────────────────────────────────────────────────────────────────────────────┐
│ For each pixel of a plurality of pixels in the difference image, fit a       │
│ point-spread function to a location in the difference image that             │
│ corresponds to the pixel and includes the pixel and surrounding pixels.      │
│ Determine one or more dimensions of the fitted point-spread function. (208)  │
│                                                                              │
│   ┌──────────────────────────────────────────────────────────────────────┐  │
│   │ The point-spread function is a two-dimensional Gaussian function.    │  │
│   │ The one or more dimensions include first and second dimensions       │  │
│   │ (e.g., σ, FWHM) indicative of widths of the fitted Gaussian          │  │
│   │ function in respective first and second directions. (110)            │  │
│   └──────────────────────────────────────────────────────────────────────┘  │
│                                                                              │
│   ┌──────────────────────────────────────────────────────────────────────┐  │
│   │ The point-spread function is a sinc function, polynomial function,   │  │
│   │ or numeric simulation. (112)                                         │  │
│   └──────────────────────────────────────────────────────────────────────┘  │
│                                                                              │
│   ┌──────────────────────────────────────────────────────────────────────┐  │
│   │ The one or more dimensions include first and second distances        │  │
│   │ between maximal gradients of the fitted point-spread function in     │  │
│   │ respective first and second directions. (114)                        │  │
│   └──────────────────────────────────────────────────────────────────────┘  │
│                                                                              │
│   ┌──────────────────────────────────────────────────────────────────────┐  │
│   │ The one or more dimensions include first and second areas under      │  │
│   │ cross-sections of the fitted point-spread function in respective     │  │
│   │ first and second directions through a maximum of the fitted          │  │
│   │ point-spread function, normalized by the height of the maximum. (116)│  │
│   └──────────────────────────────────────────────────────────────────────┘  │
└─────────────────────────────────────────────────────────────────────────────┘
                                      ↓
┌─────────────────────────────────────────────────────────────────────────────┐
│ Based at least in part on the one or more dimensions, distinguish pixels     │
│ with signals due to potential defects of interest in a plurality of defects  │
│ for the semiconductor die from pixels with signals due to nuisance           │
│ defects. (218)                                                               │
│                                                                              │
│   ┌──────────────────────────────────────────────────────────────────────┐  │
│   │ Remove, from a set of candidate pixels in the reference image,       │  │
│   │ pixels that do not satisfy a criterion that is based on at least     │  │
│   │ one of the one or more dimensions (220),                             │  │
│   │                             and/or                                    │  │
│   │ Adjust degrees of difference for respective pixels of the difference │  │
│   │ image using a criterion that is based on at least one of the one or  │  │
│   │ more dimensions of the fitted point-spread function for the          │  │
│   │ respective pixels. (222)                                             │  │
│   └──────────────────────────────────────────────────────────────────────┘  │
│                                      ↓                                       │
│   ┌──────────────────────────────────────────────────────────────────────┐  │
│   │ Identify the potential defects of interest from the set of           │  │
│   │ candidate pixels. (224)                                              │  │
│   └──────────────────────────────────────────────────────────────────────┘  │
└─────────────────────────────────────────────────────────────────────────────┘
```

Figure 2

DEFECT CLASSIFICATION BY FITTING OPTICAL SIGNALS TO A POINT-SPREAD FUNCTION

RELATED APPLICATION

This application claims priority to U.S. Provisional Patent Application No. 62/773,834, filed Nov. 30, 2018, titled "Method to Distinguish Point-Like Defects of Interest From Extended Process Variation by Fitting Defect Signals to a Point Spread Function," which is hereby incorporated by reference in its entirety for all purposes.

TECHNICAL FIELD

This disclosure relates to semiconductor inspection, and more specifically to classifying defects detected by semiconductor inspection.

BACKGROUND

Modern optical semiconductor-inspection tools use wavelengths that are significantly longer than the dimensions of a typical defect, often by an order of magnitude or more. As such, inspection tools cannot resolve the defects and thus cannot provide images showing the defects; instead, the inspection tools merely provide an indication that a defect has been detected. Furthermore, many of the detected defects are so-called nuisance defects that do not impact device functionality and are not of interest to process-integration and yield-improvement engineers. In addition, nuisance defects may outnumber defects of interest, for example by a factor of 1000 or more. The high volume of nuisance defects makes it impractical to perform subsequent failure analysis (e.g., visualization using a scanning electron microscope) on all identified defects. The high volume of nuisance defects also makes it impossible to determine whether a wafer should be scrapped or reworked due to a high number of defects of interest.

SUMMARY

Accordingly, there is a need for improved methods and systems of distinguishing defects of interest from nuisance defects. Such methods and systems may involve fitting optical-inspection results to a point-spread function.

In some embodiments, a method of identifying semiconductor defects of interest includes inspecting a semiconductor die using an optical microscope to generate a test image of the semiconductor die. The method also includes deriving a difference image between the test image of the semiconductor die and a reference image and, for each defect of a plurality of defects for the semiconductor die, fitting a point-spread function to the defect as indicated in the difference image and determining one or more dimensions of the fitted point-spread function. The method further includes distinguishing potential defects of interest in the plurality of defects from nuisance defects, based at least in part on the one or more dimensions of the fitted point-spread function for respective defects of the plurality of defects.

In some embodiments, a method of identifying semiconductor defects of interest includes inspecting a semiconductor die using an optical microscope to generate a test image of the semiconductor die. The method also includes deriving a difference image between the test image of the semiconductor die and a reference image, and fitting a summation of a plurality of point-spread functions to the difference image. Each point-spread function of the plurality of point-spread functions is centered on a distinct predefined location in the semiconductor die and has a fixed width associated with the optical microscope. Performing the fitting includes determining parameters (e.g., coefficients) of respective point-spread functions of the plurality of point-spread functions. The method further includes distinguishing potential defects of interest in a plurality of defects for the semiconductor die from nuisance defects, based at least in part on the parameters (e.g., coefficients) of the respective point-spread functions.

In some embodiments, a non-transitory computer-readable storage medium stores one or more programs for execution by one or more processors of a semiconductor-inspection system that includes an optical microscope (i.e., a semiconductor-inspection tool). The one or more programs include instructions for causing the optical microscope to inspect a semiconductor die, to generate a test image of the semiconductor die. The one or more programs also include instructions for performing the other steps of either or both of the above methods.

BRIEF DESCRIPTION OF THE DRAWINGS

For a better understanding of the various described embodiments, reference should be made to the Detailed Description below, in conjunction with the following drawings.

FIGS. 1-3 show flowcharts of methods of identifying semiconductor defects of interest in accordance with some embodiments.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

An optical semiconductor-inspection tool (i.e., an optical microscope) identifies defects on semiconductor die by illuminating portions of the die with an optical beam, which is scattered by structures on the surface of the die. The scattered optical beam is collected and imaged. The resulting image typically does not resolve defects, because the defects are much smaller than the diffraction limit for the wavelength(s) of light used in the optical beam. However, the presence of a defect causes variation in the optical signal of the scattered optical beam. This variation can be detected and the location of potential defects can thus be identified.

Defects identified in this manner include both defects of interest and nuisance defects. Defects of interest are typically isolated and localized (e.g., point-like), whereas nuisance defects may be spatially extended (e.g., as the result of process variation). This distinction may be exploited to distinguish defects of interest from many nuisance defects, by fitting the optical signal as imaged by the optical microscope to a point-spread function. (A point-spread function is an indication of the impulse response of the optical microscope, with a shape in the image that represents an unresolved defect.) The resulting fit gives an indication of the dimensions, and thus the size, of the defect. Defects can then be classified as either defects of interest or nuisance defects, based at least in part on their sizes as inferred through the fit.

Figure 1:
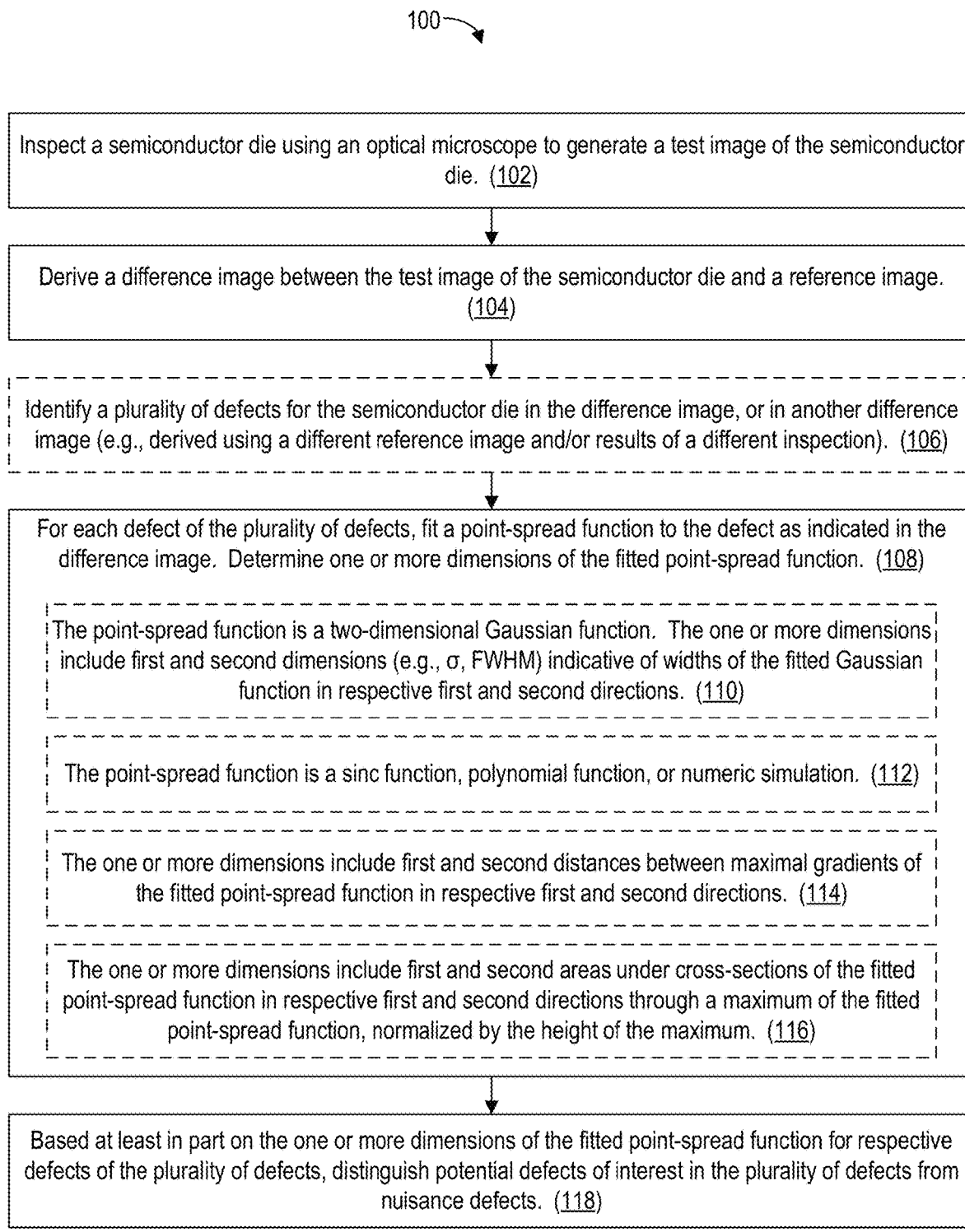
Figure 5:
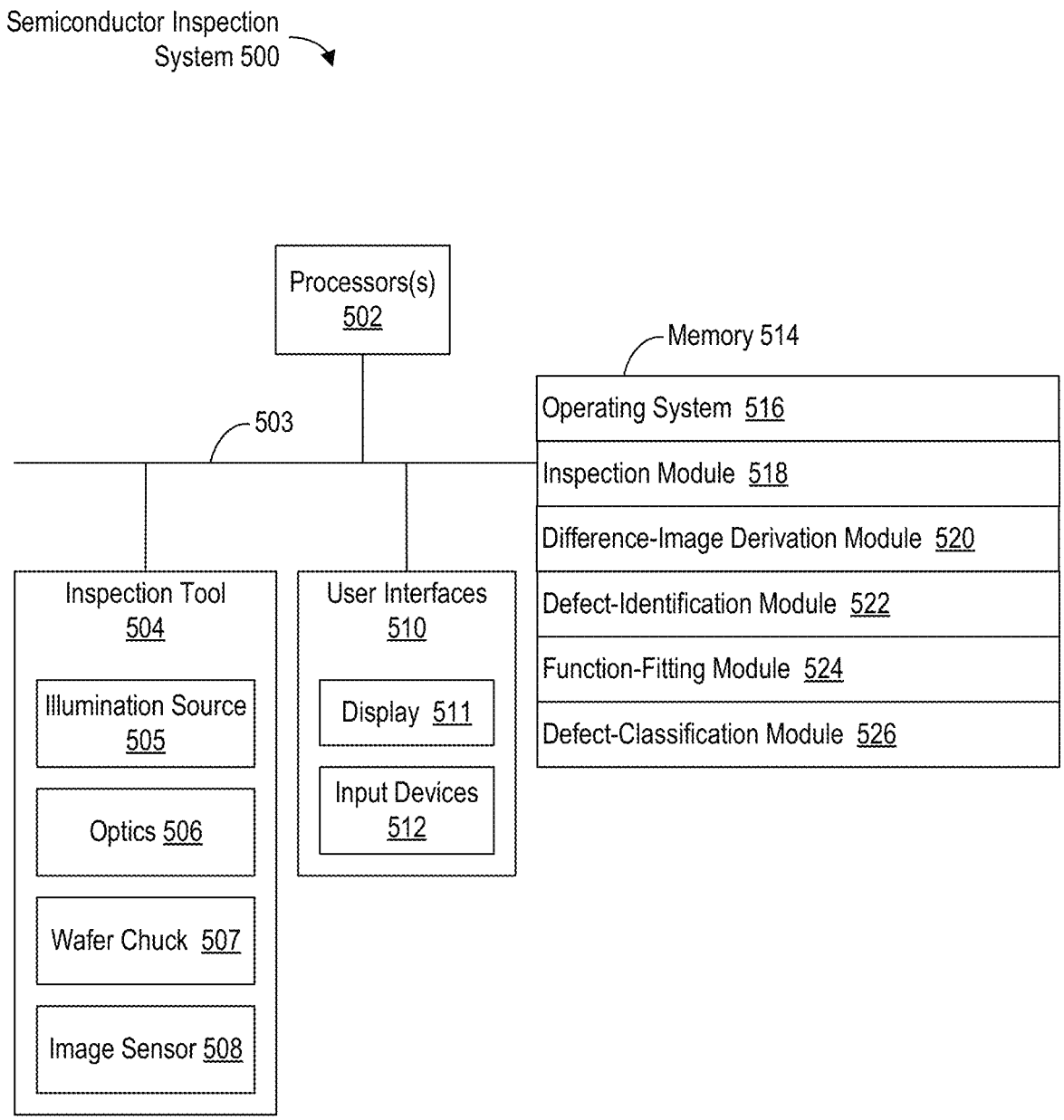
FIG. 5 is a block diagram of a semiconductor-inspection system in accordance with some embodiments.

FIG. 1 shows a flowchart of a method 100 of identifying semiconductor defects of interest in accordance with some embodiments. The method 100 may be performed using the semiconductor-inspection system 500 (FIG. 5). Steps in the method 100 may be combined or broken out.

In the method 100, a semiconductor die is inspected (102) using an optical microscope (e.g., the inspection tool 504, FIG. 5) to generate a test image of the semiconductor die. (The test image may be an image of the entire die or a portion of the die.) A difference image between the test image and a reference image of the semiconductor die is derived (104). The difference image, which may be derived by subtracting the reference image from the test image or vice versa, indicates degrees of difference between the test image and the reference image on a pixel-by-pixel basis. These degrees of difference may be referred to as gray levels. The larger the magnitude of a degree of difference (i.e., the larger the gray-level magnitude), the more likely a given pixel corresponds to a defect on the semiconductor die.

In some embodiments, the reference image is an image of a neighboring die on the same wafer, an image of any other die on the same wafer, or an image of a die on another wafer. In some embodiments, the reference image is a combination (e.g., a median) of images of multiple die (e.g., multiple adjacent die, die on the same wafer, and/or die on other wafers). In some embodiments, the reference image is derived from the design of the die, for example by running the die's layout (e.g., as specified in a gds file) through a simulator that simulates imaging by the optical microscope. In some embodiments, for an array area on the die (i.e., an area on the die in which the same pattern is repeated), the reference image is a neighboring instance of the pattern or a combination of neighboring instances of the pattern. The repeating pattern may be a memory cell or group of memory cells.

A plurality of defects for the semiconductor die is identified (106) in the difference image of step 104, or in a separate difference image. If a separate difference image is used, the separate difference image may have been generated using a different reference image (e.g., of any of the types of reference images described for step 104) and/or results of a different inspection (e.g., using a different optical mode than the optical mode used in the inspection of step 102). Defects may be identified by determining whether the corresponding gray levels in the difference image satisfy one or more criteria (e.g., have magnitudes that exceed, or equal or exceed, specified thresholds). While shown as being performed after step 104, step 106 may alternatively be performed before step 102 or between steps 102 and 104, if a separate difference image is used.

For each defect of the plurality of defects, a point-spread function is fit (108) to the defect as indicated in the difference image of step 104. One or more dimensions of the fitted point-spread function are determined. The one or more dimensions provide a measure of the size of the defect (e.g., of widths of the defect in respective directions).

In some embodiments, the point-spread function is (110) a two-dimensional Gaussian function:

$$I(A, x_0, y_0, \sigma_x, \sigma_y) = A\exp\left[-\frac{(x-x_0)^2}{2\sigma_x^2} - \frac{(y-y_0)^2}{2\sigma_y^2}\right] \quad (1)$$

where A is a coefficient that indicates the maximum intensity, $x_0$ and $y_0$ are coordinates of the center of the point-spread function and of the defect (and correspond to coordinates of the pixel on which the defect is centered in the difference image), and $\sigma_x$ and $\sigma_y$ are standard deviations of the point-spread function in two orthogonal directions. The one or more dimensions include first and second dimensions (e.g., standard deviations $\sigma_x$ and $\sigma_y$, or full widths at half-maximum in the x- and y-directions) indicative of widths of the fitted Gaussian function in respective first and second directions.

In some embodiments, the point-spread function is (112) a sinc function (i.e., cardinal sine function), polynomial function, or other analytical function. In some embodiments, the point-spread function is (112) a numeric simulation, such that step 108 includes fitting the numeric simulation to the defect as indicated by the corresponding signal in the difference image of step 104.

In some embodiments, the one or more dimensions include (114) first and second distances between maximal gradients of the fitted point-spread function in respective first and second directions (e.g., in the x- and y-directions). The distance between maximal gradients in a particular direction is another indicator of defect width.

In some embodiments, the one or more dimensions include (116) first and second areas under cross-sections of the fitted point-spread function in respective first and second directions (e.g., in the x- and y-directions) through a maximum of the fitted point-spread function, normalized by the height of the maximum.

Based at least in part on the one or more dimensions of the fitted point-spread function for respective defects of the plurality of defects, potential defects of interest in the plurality of defects are distinguished (118) from nuisance defects.

In some embodiments, distinguishing (118) potential defects of interest from nuisance defects includes determining, for a particular defect, whether a first dimension of the one or more dimensions of the fitted point-spread function exceeds, or equals or exceeds, a first threshold. If the first dimension exceeds, or equals or exceeds, the first threshold, then the defect is classified as a nuisance defect. Distinguishing (118) potential defects of interest from nuisance defects may also or alternatively include determining, for a particular defect, whether the first dimension is less than, or less than or equal to, a second threshold, wherein the second threshold is less than the first threshold. If the first dimension is less than, or less than or equal to, the second threshold, then the defect is classified as a nuisance defect. Similar determinations may be made for a second dimension of the one or more dimensions (e.g., with first and second thresholds equal to or distinct from the first and second thresholds used for the first dimension), with defects being classified accordingly.

Figure 4:
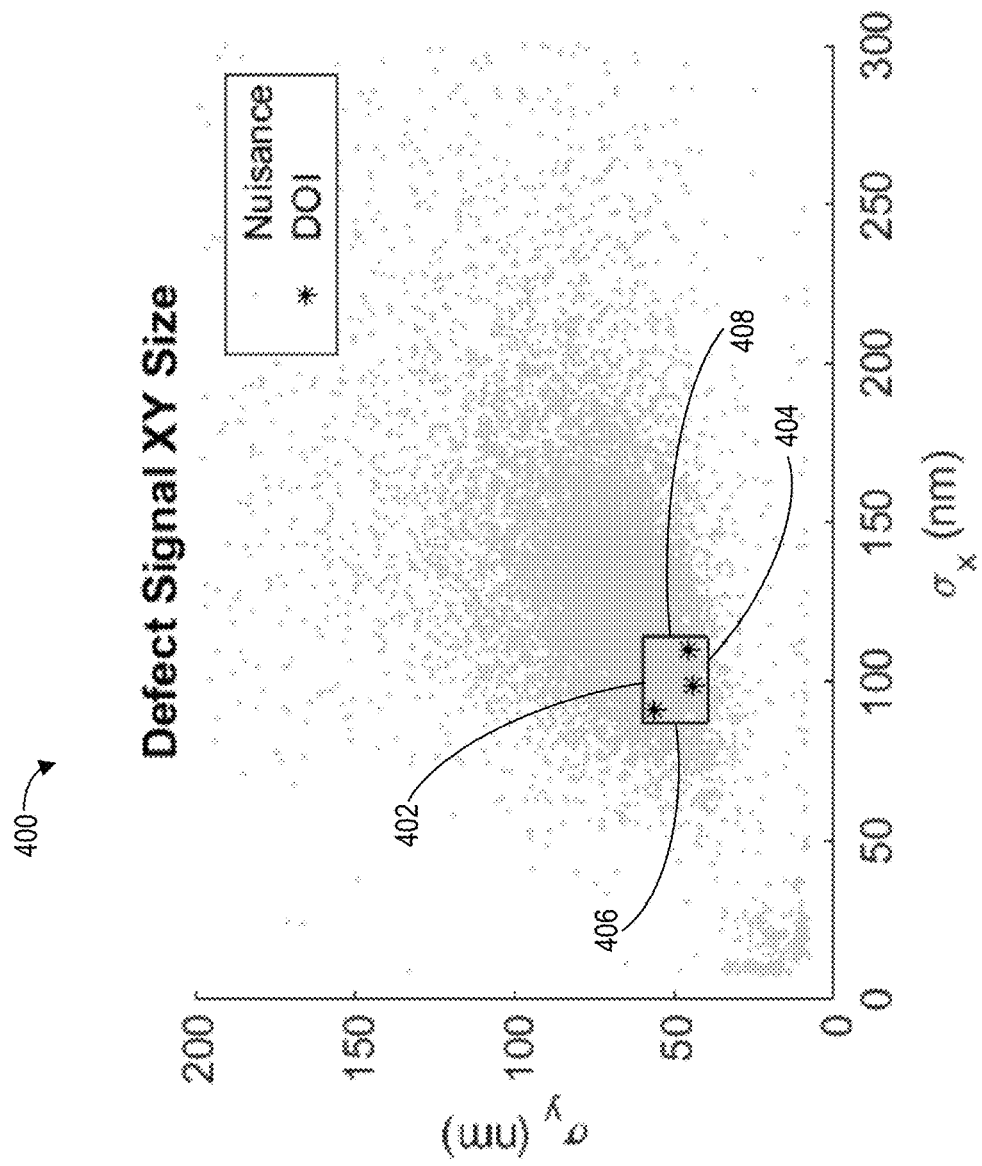
FIG. 4 is a scatterplot showing a distribution of standard deviations in two directions for defects on a die, in accordance with some embodiments.

FIG. 4 is a scatterplot 400 showing a distribution of dimensions $\sigma_x$ and $\sigma_y$ for defects on a die, as determined in step 108, in accordance with some embodiments. Defects of interest are shown as black asterisks, while nuisance defects are shown as gray dots. The defects of interest are situated in a rectangle defined by upper $\sigma_y$ threshold 402, lower $\sigma_y$ threshold 404, lower $\sigma_x$ threshold 406, and upper $\sigma_x$ threshold 408. The thresholds 402, 404, 406, and 408, which may also be referred to as cut lines, may be applied as described above for the first and second thresholds. Accordingly, in some embodiments, the method 100 classifies as a nuisance defect any defect that falls outside of the rectangle. Any defect that falls within the rectangle may be classified as a potential defect of interest, or may be further analyzed based on other factors. While some of the defects within the rectangle are actually nuisance defects, application of the thresholds 402, 404, 406, and/or 408 still dramatically reduces the number of nuisance defects from the candidate set of potential defects of interest.

In some embodiments in which the one or more dimensions include two dimensions (e.g., corresponding to the x- and y-axes), distinguishing (118) potential defects of interest from nuisance defects includes determining, for a particular defect, whether a metric that is a function of the two dimensions satisfies a threshold. If the metric does not satisfy the threshold, then the defect is classified as a nuisance defect. The metric may correspond to a particular shape (e.g., circle, ellipse, etc.) in a plane (e.g., the $\sigma_x$-$\sigma_y$ plane of FIG. 4), where defects that do not satisfy the threshold are those defects that fall outside of the shape.

In some embodiments, distinguishing (118) potential defects of interest from nuisance defects includes providing the one or more dimensions of the fitted point-spread function for the respective defects of the plurality of defects as input to a machine-learning algorithm trained to distinguish potential defects of interest from nuisance defects. The machine-learning algorithm may have been trained using a training set of dimensions determined from fitted point-spread functions for known defects of interest and known nuisance defects (e.g., as identified through scanning-electron microscopy and/or other failure-analysis techniques).

In the method 100, the defects are identified (i.e., detected) before the fitting is performed. Alternatively, fitting may be performed before the defects are detected. FIG. 2 shows a flowchart of such a method 200 of identifying semiconductor defects of interest in accordance with some embodiments. The method 200, like the method 100, may be performed using the semiconductor-inspection system 500 (FIG. 5). Steps in the method 200 may be combined or broken out.

In the method 200, a semiconductor die is inspected (102) and a difference image between the test image and a reference image is derived (104), as described for the method 100 (FIG. 1).

For each pixel of a plurality of pixels in the difference image, a point-spread function is fit (208) to a location in the difference image corresponding to the pixel. The location includes the pixel and other nearby pixels (e.g., surrounding pixels) within the width of the point-spread function of the optical microscope. One or more dimensions of the fitted point-spread function are determined. The fitting of step 208 may be performed in the same manner as for the step 108 of the method 100 (FIG. 1). For example, step 208 may include step 110, 112, 114, or 116. The plurality of pixels for which the point-spread function is fit may be every pixel in the reference image or a subset of pixels that are identified as candidate pixels (e.g., all pixels in the reference image with local maxima and/or minima gray-level values). Because the plurality of pixels in step 208 includes pixels that correspond to defects, step 208 is an example of step 108 of the method 100 (FIG. 1).

Based at least in part on the one or more dimensions, pixels in the plurality of pixels with signals due to potential defects of interest in a plurality of defects for the semiconductor die are distinguished (218) from pixels with signals due to nuisance defects. Step 218 provides a way to distinguish potential defects of interest from nuisance defects, as in step 118 of the method 100 (FIG. 1).

In some embodiments, pixels that do not satisfy a criterion are removed (220) from a set of candidate pixels in the reference image. The criterion is based on at least one of the one or more dimensions. For example, the criterion may be whether pixels satisfy one or more of the thresholds 402, 404, 406, and 408 (FIG. 4), or whether a metric that is a function of multiple dimensions satisfies a criterion (e.g., whether pixels fall within a corresponding shape in a plane, such as the $\sigma_x$-$\sigma_y$ plane of FIG. 4). In some embodiments, degrees of difference for respective pixels of the difference image in the set of candidate pixels are adjusted (222) using a criterion that is based on at least one of the one or more dimensions of the fitted point-spread function for the respective pixels. The magnitude of a degree of difference may be decreased if the one or more dimensions of the fitted point-spread function correspond to a likelihood that a defect is not a defect of interest, and/or may be increased if the one or more dimensions of the fitted point-spread function correspond to a likelihood that a defect is a defect of interest. After performing steps 220 and/or 222, the potential defects of interest are identified (224) from the set of candidate pixels. Step 220 removes pixels that probably correspond to nuisance defects from the set of candidate pixels. Step 222 makes it less likely that pixels that probably correspond to nuisance defects are identified in step 224, and/or makes it more likely that pixels that probably correspond to defects of interest are identified in step 224. In either or both of these manners, potential defects of interest are distinguished from nuisance defects, since the ratio of defects of interest to nuisance defects identified in step 224 is improved.

In some embodiments, the methods 100 and/or 200 further include determining a goodness of fit of the fitted point-spread function for respective defects of the plurality of defects. For example, the goodness of fit may be determined by the sum of the square of residuals (the "R-squared" metric) for the fit or by the largest single residual for the fit. Distinguishing (118) the potential defects of interest from nuisance defects may be further based at least in part on the goodness of fit for the respective defects: increased goodness of fit is directly correlated with an increased probability that a defect is a defect of interest and not a nuisance defect, and defects are classified accordingly. For example, if the goodness of fit does not satisfy a threshold, the corresponding defect may be classified as a nuisance defect or may be excluded from a set of candidate pixels. In another example, a degree of difference may be adjusted based on the goodness of fit, by analogy to step 222 (e.g., such that a low goodness of fit causes one or more corresponding pixels to have their gray levels adjusted so that they are less likely to be identified as defects).

Figure 3:
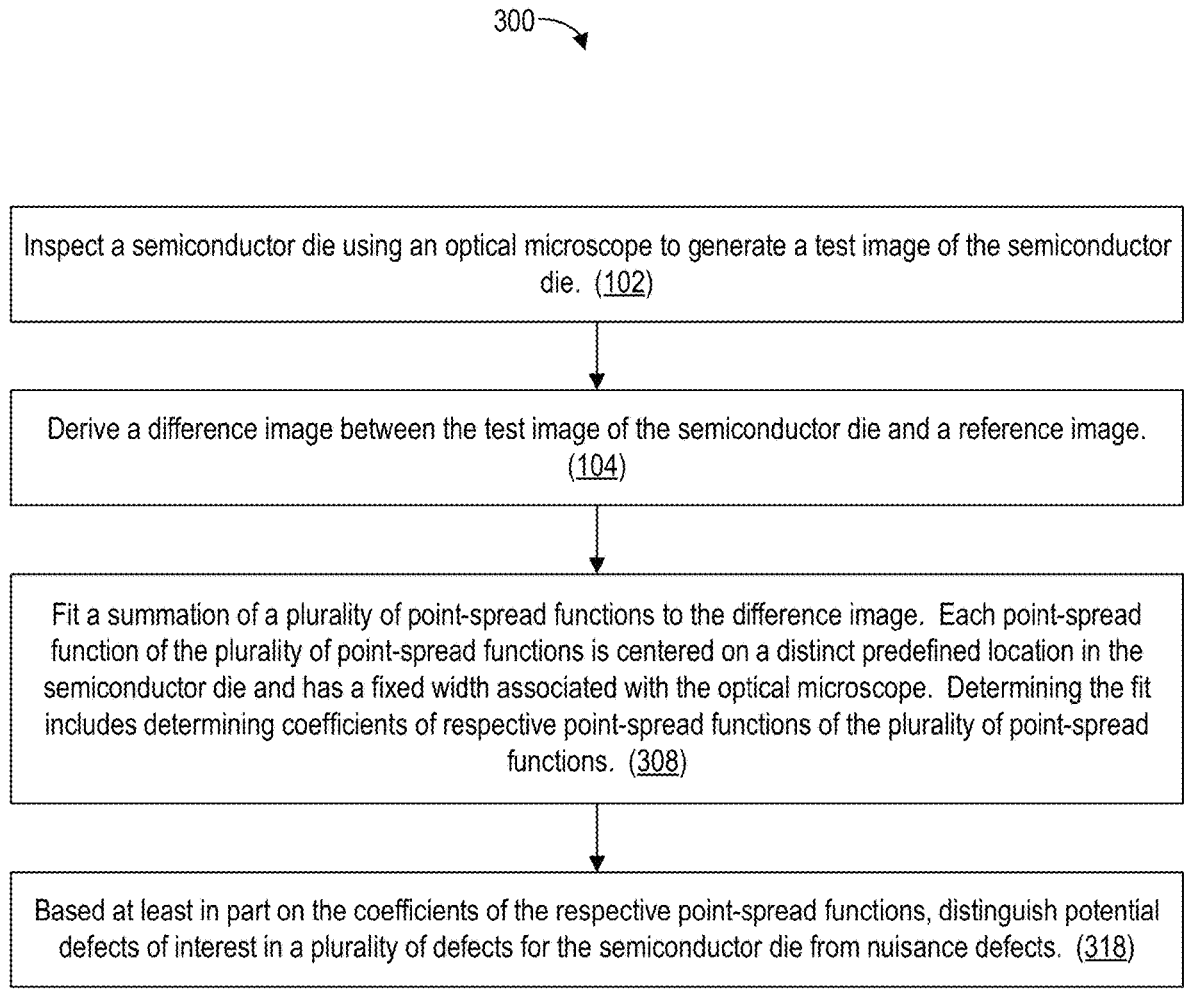

FIG. 3 shows a flowchart of yet another method 300 of identifying semiconductor defects of interest in accordance with some embodiments. The method 300, like the methods 100 (FIG. 1) and 200 (FIG. 2), may be performed using the semiconductor-inspection system 500 (FIG. 5). Steps in the method 300 may be combined or broken out.

In the method 300, a semiconductor die is inspected (102) and a difference image between the test image of the semiconductor die and a reference image is derived (104), as described for the method 100 (FIG. 1).

A summation of a plurality of point-spread functions is fit (308) to the difference image. Each point-spread function of the plurality of point-spread functions is centered on a distinct predefined location in the semiconductor die and has a fixed width associated with the optical microscope. (The method may allow for a degree movement of the predefined locations in accordance with process variation.) Determining the fit includes determining coefficients of respective point-spread functions of the plurality of point-spread functions in the summation.

For example, a summation of a plurality of Gaussian point-spread functions may be used:

$$I(A_1, A_2, \ldots, A_N) = \sum_{i=1}^{N} A_i \exp\left[-\frac{(x-x_{0i})^2}{2\sigma_x^2} - \frac{(y-y_{0i})^2}{2\sigma_y^2}\right] \quad (2)$$

where $A_i$ is a coefficient to be determined, $x_{0i}$ and $y_{0i}$ are coordinates for a respective predefined location, $\sigma_x$ and $\sigma_y$ are standard deviations of the point-spread function in the x- and y-directions, and N is the number of distinct predefined locations and thus the number of point-spread functions. The values of $\sigma_x$ and $\sigma_y$ are fixed (e.g., known values for the inspection tool 504, FIG. 5, are used). For example:

$$\sigma = \frac{\lambda}{2\sqrt{2\ln(2)(NA_{illumination} + NA_{collection})}} \quad (3)$$

where $\lambda$ is the optical-inspection wavelength, $NA_{illumination}$ is the numerical aperture of the illumination system in the inspection tool, and $NA_{collection}$ is the numerical aperture of the collection system in the inspection tool.

Gaussian point-spread functions are merely one example of point-spread functions that may be summed in the method 300. Other examples (e.g., as described for the step 108 of the method 100, FIG. 1) are possible.

Based at least in part on the coefficients of the respective point-spread functions, potential defects of interest in a plurality of defects for the semiconductor die are distinguished (318) from nuisance defects. A coefficient (e.g., an $A_i$ value) with a large magnitude as compared to other coefficients (e.g., other $A_i$ values) suggests that a defect of interest is present at the location for the corresponding point-spread function. A coefficient that is in the same range as other coefficients, however, is suggestive of a nuisance defect (e.g., resulting from process variation). A defect therefore may be classified as a defect of interest if its corresponding coefficient (or the magnitude thereof) satisfies (e.g., exceeds, or equals or exceeds) a threshold, and may be classified as a nuisance defect if its corresponding coefficient (or the magnitude thereof) does not satisfy the threshold. The threshold may be predefined or may be a function (e.g., mean or median) of other coefficient values (e.g., other $A_i$ values).

The method 300 may be performed in conjunction with the method 100 or 200, such that defects may be classified as defects of interest based, at least in part, on dimensions of fitted point-spread functions as determined in the method 100 or 200 and also on point-spread-function coefficients as determined in the method 300.

In some embodiments of the methods 100, 200, and/or 300, a report specifying the potential defects of interest is generated. For example, the report may list all of the defects (e.g., with their coordinates) and specify whether each has been classified as a potential defect of interest or a nuisance defect. Alternatively, the report may list the potential defects of interest (e.g., with their coordinates) and omit the nuisance defects. The report may be graphical; for example, the report may show a map of the die with indications of the locations of the potential defects of interest. The report may be displayed (e.g., on display 511, FIG. 5) and/or transmitted to a client device for display.

The methods 100, 200, and 300 thus allow potential defects of interest to be distinguished from nuisance defects despite the fact that the defects may not be resolved in the difference image. In some embodiments of the methods 100, 200, and/or 300, a decision whether to scrap, rework, or continue to process a wafer is made based at least in part on the identified potential defects of interest. In some embodiments of the methods 100, 200, and/or 300, failure analysis (e.g., including scanning-electron-microscope imaging) is subsequently performed for one or more of the potential defects of interest.

FIG. 5 is a block diagram of a semiconductor-inspection system 500 in accordance with some embodiments. The semiconductor-inspection system 500 includes a semiconductor-inspection tool 504 (i.e., optical microscope) and an associated computer system that includes one or more processors 502 (e.g., CPUs), user interfaces 510, memory 514, and one or more communication buses 503 interconnecting these components. The semiconductor-inspection system 500 may also include one or more network interfaces (wired and/or wireless, not shown) for communicating with (e.g., retrieving recipes from and/or transmitting data to) remote computer systems.

The inspection tool 504 includes an illumination source 505, illumination and collection optics 506, a wafer chuck 507, and an image sensor 508. Semiconductor wafers are loaded onto the wafer chuck 507 for inspection. An optical beam scattered off of the wafer surface is imaged by the image sensor 508.

The user interfaces 510 may include a display 511 and one or more input devices 512 (e.g., a keyboard, mouse, touch-sensitive surface of the display 511, etc.). The display 511 may display results of defect classification.

Memory 514 includes volatile and/or non-volatile memory. Memory 514 (e.g., the non-volatile memory within memory 514) includes a non-transitory computer-readable storage medium. Memory 514 optionally includes one or more storage devices remotely located from the processors 502 and/or a non-transitory computer-readable storage medium that is removably inserted into the computer system. In some embodiments, memory 514 (e.g., the non-transitory computer-readable storage medium of memory 514) stores the following modules and data, or a subset or superset thereof: an operating system 516 that includes procedures for handling various basic system services and for performing hardware-dependent tasks, an inspection module 518 (e.g., for causing step 102 to be performed), a difference-image derivation module 520 (e.g., for performing step 104), a defect identification module 522 (e.g., for performing step 106 and/or 224), a function-fitting module 524 (e.g., for performing steps 108, 208, and/or 308), and a defect-classification module 526 (e.g., for performing steps 118 and/or 318).

The memory 514 (e.g., the non-transitory computer-readable storage medium of the memory 514) thus includes instructions for performing all or a portion of the methods 100, 200, and/or 300 (FIGS. 1-3). Each of the modules stored in the memory 514 corresponds to a set of instructions for performing one or more functions described herein. Separate modules need not be implemented as separate software programs. The modules and various subsets of the modules may be combined or otherwise re-arranged. In some embodiments, the memory 514 stores a subset or superset of the modules and/or data structures identified above.

FIG. 5 is intended more as a functional description of the various features that may be present in a semiconductor-inspection system than as a structural schematic. For example, the arrangement of the components of the inspection tool 504 may vary (e.g., in manners known in the art). Items shown separately could be combined and some items could be separated. Furthermore, the functionality of the semiconductor-inspection system 500 may be split between multiple devices. For example, a portion of the modules stored in the memory 514 may alternatively be stored in one or more computer systems communicatively coupled with the semiconductor-inspection system 500 through one or more networks.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A non-transitory computer-readable storage medium storing one or more programs for execution by one or more processors of a semiconductor-inspection system that includes an optical microscope, the one or more programs comprising instructions for:
   deriving a difference image between a test image of a semiconductor die and a reference image, wherein the test image is generated by inspecting the semiconductor die using the optical microscope;
   identifying a defect in the difference image;
   fitting a point-spread function to the identified defect as indicated in the difference image and determining one or more dimensions of the fitted point-spread function; and
   based at least in part on the one or more dimensions of the fitted point-spread function for the identified defect, determining whether the identified defect is a defect of interest or a nuisance defect.

2. The computer-readable storage medium of claim 1, wherein:
   the point-spread function is a two-dimensional Gaussian function; and
   the one or more dimensions comprise a first dimension indicative of a width of the fitted Gaussian function in a first direction and a second dimension indicative of a width of the fitted Gaussian function in a second direction.

3. The computer-readable storage medium of claim 2, wherein:
   the first dimension is selected from the group consisting of a standard deviation of the fitted Gaussian function in the first direction and a full width at half maximum of the fitted Gaussian function in the first direction; and
   the second dimension is selected from the group consisting of a standard deviation of the fitted Gaussian function in the second direction and a full width at half maximum of the fitted Gaussian function in the second direction.

4. The computer-readable storage medium of claim 1, wherein the one or more dimensions comprise:
   a first distance between maximal gradients of the fitted point-spread function in a first direction; and
   a second distance between maximal gradients of the fitted point-spread function in a second direction.

5. The computer-readable storage medium of claim 1, wherein the one or more dimensions comprise:
   a first area under a cross-section of the fitted point-spread function in a first direction through a maximum of the fitted point-spread function, normalized by the height of the maximum; and
   a second area under a cross-section of the fitted point-spread function in a second direction through the maximum, normalized by the height of the maximum.

6. The computer-readable storage medium of claim 1, wherein the point-spread function is a sinc function.

7. The computer-readable storage medium of claim 1, wherein the point-spread function is a polynomial function.

8. The computer-readable storage medium of claim 1, wherein the instructions for fitting the point-spread function to the defect comprise instructions for fitting a numeric simulation of the point-spread function to the defect.

9. The computer-readable storage medium of claim 1, wherein the instructions for determining whether the identified defect is a defect of interest or a nuisance defect comprise instructions for:
   determining whether a first dimension of the one or more dimensions of the fitted point-spread function exceeds, or equals or exceeds, a first threshold; and
   in response to determining that the first dimension exceeds, or equals or exceeds, the first threshold, classifying the identified defect as a nuisance defect.

10. The computer-readable storage medium of claim 9, wherein the instructions for determining whether the identified defect is a defect of interest or a nuisance defect further comprise instructions for:
   determining whether the first dimension is less than, or less than or equal to, a second threshold, wherein the second threshold is less than the first threshold; and
   in response to determining that the first dimension is less than, or less than or equal to, the second threshold, classifying the identified defect as a nuisance defect.

11. The computer-readable storage medium of claim 1, wherein the one or more dimensions of the fitted point-spread function comprise two dimensions, and the instructions for determining whether the identified defect is a defect of interest or a nuisance defect comprise instructions for:
   determining whether a metric that is a function of the two dimensions satisfies a threshold; and
   in response to a determination that the metric does not satisfy the threshold, classifying the identified defect as a nuisance defect.

12. The computer-readable storage medium of claim 11, wherein the instructions for determining whether the identified defect is a defect of interest or a nuisance defect comprise instructions for providing the one or more dimensions of the fitted point-spread function for the identified defect as input to a machine-learning algorithm trained to distinguish potential defects of interest from nuisance defects.

13. The computer-readable storage medium of claim 11, wherein:
the one or more programs further comprise instructions for determining a goodness of fit of the fitted point-spread function;
the goodness of fit is a sum of squares of the residuals for the fitted point-spread function or a largest single residual for the fitted point-spread function; and
determining whether the identified defect is a defect of interest or a nuisance defect is further based at least in part on the goodness of fit.

14. The computer-readable storage medium of claim 11, wherein the identified defect is not resolved in the difference image.

15. The computer-readable storage medium of claim 11, wherein the one or more programs further comprise instructions for generating a report specifying defects of interest.

16. A semiconductor-inspection system, comprising:
an optical microscope;
one or more processors; and
memory storing one or more programs for execution by the one or more processors, the one or more programs including instructions for:
deriving a difference image between a test image of a semiconductor die and a reference image, wherein the test image is generated by inspecting the semiconductor die using the optical microscope;
identifying a defect in the difference image;
fitting a point-spread function to the identified defect as indicated in the difference image and determining one or more dimensions of the fitted point-spread function; and
based at least in part on the one or more dimensions of the fitted point-spread function for the identified defect respective defects, determining whether the identified defect is a defect of interest or a nuisance defect.

17. A method, comprising:
inspecting a semiconductor die using an optical microscope to generate a test image of the semiconductor die; and
in a computer system comprising one or more processors and memory storing instructions for execution by the one or more processors:
deriving a difference image between the test image of the semiconductor die and a reference image;
identifying a defect in the difference image;
fitting a point-spread function to the identified defect as indicated in the difference image and determining one or more dimensions of the fitted point-spread function; and
based at least in part on the one or more dimensions of the fitted point-spread function for the identified defect, determining whether the identified defect is a defect of interest or a nuisance defect.

18. A non-transitory computer-readable storage medium storing one or more programs for execution by one or more processors of a semiconductor-inspection system that includes an optical microscope, the one or more programs comprising instructions for:
deriving a difference image between a test image of the semiconductor die and a reference image, wherein the test image is generated by inspecting the semiconductor die using the optical microscope;
fitting a summation of a plurality of point-spread functions to the difference image, wherein each point-spread function of the plurality of point-spread functions is centered on a distinct predefined location in the semiconductor die and has a fixed width associated with the optical microscope, the fitting comprising determining coefficients of the plurality of point-spread functions; and
based at least in part on the coefficients of the plurality of point-spread functions, distinguishing potential defects of interest in a plurality of defects for the semiconductor die from nuisance defects.

* * * * *